United States Patent Office 3,826,814
Patented July 30, 1974

3,826,814
PROCESS OF MAKING A FINELY DIVIDED SILICIC ACID HAVING REDUCING PROPERTIES
Alfred Illigen, Lochau, Austria, and Walter Neugebauer, Constance, Germany, assignors to Deutsche Gold- und Silber-Scheideanstalt vormals Roessler, Frankfurt am Main, Germany
Continuation of abandoned application Ser. No. 51,183, June 30, 1970. This application Mar. 28, 1972, Ser. No. 238,971
Claims priority, application Germany, July 1, 1969, P 19 33 292.4
The portion of the term of the patent subsequent to July 4, 1989, has been disclaimed
Int. Cl. C01b 33/12, 33/18
U.S. Cl. 423—336         6 Claims

ABSTRACT OF THE DISCLOSURE

A finely divided silicic acid having reducing properties is made by reacting gaseous silicon monoxide at temperatures above 1500° C. with water vapor and subjecting the formed reaction product to sudden chilling immediately after its formation.

BACKGROUND OF THE INVENTION

This is a continuation of application Ser. No. 51,183 filed June 30, 1970 now abandoned.

The present invention relates to a process for making finely divided silicic acid having reducing properties from oxidic silicon starting products and water.

Silicic acids having reducing properties have been described in the literature. According to the conventional technique, they are made by a hydrolysis of trichlorosilane under mild conditions at room temperature or at a temperature which is still lower (see German published application 1,026,228). This process, however, requires a comparatively expensive raw material and, in addition to the desired silicic acid having reducing properties, it furnishes double its weight in undesirable and corrosive hydrogen chloride as a by-product in the form of a dilute aqueous hydrochloric acid. The removal of the residual chlorine from the reaction product is difficult and requires special operational steps.

There are several ways to form finely divided silicic acid on an industrial scale, such as by treatment of water glass solutions with acids, by flame hydrolysis of silicon halides or by high-temperature oxidation of gaseous silicon monoxides.

U.S. Pat. No. 2,535,659 also describes a process in which silicon and silicon monoxide entrained in a carrier gas are oxidized in water vapor at a high temperature. The object of this kind of process is a silicic acid in the form of hollow spheres of microscopic size with a diameter between 0.1 and 5 $\mu$m. The thus-produced product, however, has no reducing properties.

German Pat. 1,072,601 also discloses a process for oxidizing a finely divided solid brown silicon monoxide to form silicic acid by reaction in a temperature range between 500 and 1000° C. using, among others, water vapor as the oxidizing agent. The objective of this process is a complete oxidation of the raw material to silicic acid.

Another process for the thermal making of finely divided silicic acid proceeds by cooling hot gases charged with gaseous silicic acid by means of spray injecting water; see U.S. Pat. 3,068,089. However, no chemical effect of the water in this case is accomplished beyond the chilling effect. Finely divided silicic acid is of broad use in many areas of modern technology, for instance as reinforcing filler in natural and synthetic rubber, in silicon rubber and in other elastomers, furthermore for making greases, as additive in lacquers and as a base for ointments, etc. The multiplicity of uses has resulted in the development of a large number of different types of silicic acids. The properties of the silicic acid corresponding to the different uses are determined by the chemical properties of its surface. An effort has therefore been made through fine dispersion of the material to obtain a surface as large as possible. In general, specific surfaces between 50 and 300 m.$^2$ are of particular interest.

It is therefore a specific object of the present invention to provide for a process of making finely divided silicic acid of a fine division of particles extending through the entire technically interesting surface range and which acid also has the particular feature of having reducing properties.

SUMMARY OF THE INVENTION

The invention is based on the concept that a finely divided silicic acid with reducing properties can be made by reacting gaseous silicon monoxide at temperatures above 1500° C. with water vapor and then subjecting the formed reaction product to a sudden chilling.

The novel features which are considered as characteristic for the invention are set forth in particular in the appended claims. The invention itself, however, both as to its construction and operation, together with additional objects and advantages thereof, will be best understood from the following description embodiments when read in connection with the accompanying drawing.

DESCRIPTION OF THE PREFERRED EMBODIMENTS

Since water vapor at high temperatures is a strong oxidizing agent, and since heretofore all that was known was that the treatment of silicon monoxide with water vapor for complete oxidation would lead to the positive tetravalent form of silicon, it was unexpected that the process of the invention would result in a silicic acid having reducing properties. Apparently, what happens is that in the process of the invention an intermediate stage of the oxidation is obtained in which silicon-hydrogen bonds are formed on the product. The presence of Si—H bonds is seen in the ultra-red spectrum. The X-ray diagrams obtained by the Debye-Scherrer method of the reducing silicic acid in addition shows the presence of amorphous silicic acid.

The reducing properties of the silicic acid obtained by the process of the invention are manifest, for instance, in the fact that the silicic acid with water results in development of hydrogen that from certain metal salt solutions such as silver nitrate, gold chloride, palladium chloride, where the silicic acid liberates the metals and reduces the metal ions to lower valences such as by reduction of $MnO_4^-$ to $MnO_2$ or $Fe^{3+}$ to $Fe^{2+}$. Certain organic dyes such as methylene blue are subject to discoloration in the process.

Processes have already been disclosed whereby a brown, finely divided product can be obtained from gaseous silicon monoxide by chilling in an inert atmosphere such as nitrogen. This product consists of an intimate mixture of finely divided silicic acid and silicon which appear as disproportionation products of the gaseous silicon monoxide upon chilling. The product causes generation of hydrogen if it is brought into contact with sodium hydroxide.

As distinguished from this brown-colored mixture, the silicic acids of the present invention have a white color end generate hydrogen already in cold water. While the X-ray diffraction of the earlier mixed product shows metallic silicon in addition to amorphous silicic acid the product of the invention shows only the diffuse refraction ring of the amorphous silicic acid.

The silicic acids having reducing properties, as produced in the process of the invention, have many uses. Apart from those uses where the reducing property is in the foreground, the silicic acids of the invention can be employed as reinforcing fillers in rubbers and plastics and also as thickening agents in oils, lacquers, etc.

Figure 1:
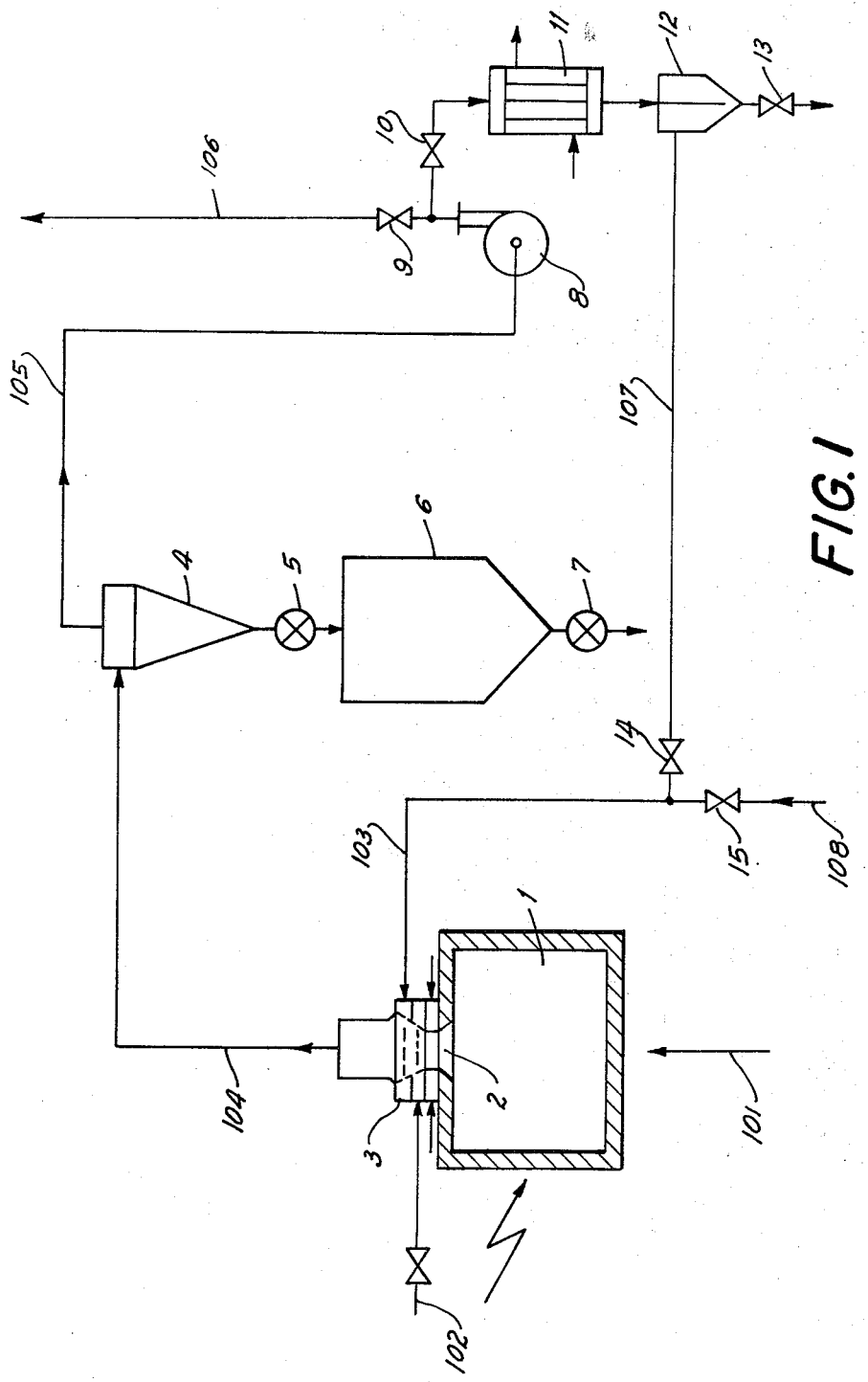
FIG. 1 shows, in a diagrammatic manner, the various process steps.

The following is a brief description of the process of the invention made with reference to FIG. 1

A gas mixture of silicon monoxide and carbon monoxide is formed in conventional manner in an electric arc furnace 1 from a continuously fed mixture of quartz sand and coke which are introduced through duct 101. The gas mixture thus fromed which has a temperature in excess of 1500° C. then passes through an aperture in the roof plate of the furnace. The mixture is reacted with water in the mixing chamber 3 which is immediately adjacent to the outlet opening for the gas. The mixing chamber is water cooled. The water vapor for the reaction is introduced through a duct 102. The reaction product is subjected to chilling at the place of this formation by means of a gas introduced through duct 103 and while suspended in the gas is then passed through duct 104 to a separator where it is separated from the gas stream and thereafter passed into receiving vessel 6 by means of a compartmental valve 5. From the receiving vessel it is possible to obtain the reducing silicic acid as desired by means of a bucket wheel 7. The gas which has been separated from the solid product is removed from the separator 4 by suction through a duct 105 by means of blower 8. The gas was then removed to the outside through valve 9 and duct 106.

If a circulation is desired for the gas, only part of the flow is removed through duct 106 while the main portion of the gas, by means of valve 10 and cooling device 11, causes the condensation of most of the water vapor entrained in the gas stream. The condensate can then be removed by means of the separating vessel 12 and the valve 13. The dried gas can then be reintroduced into the process by means of duct 107 and valve 14.

If no circulation is desired, the feeding of the chilling gas is effected through duct 108 and valve 15.

Figure 2A:
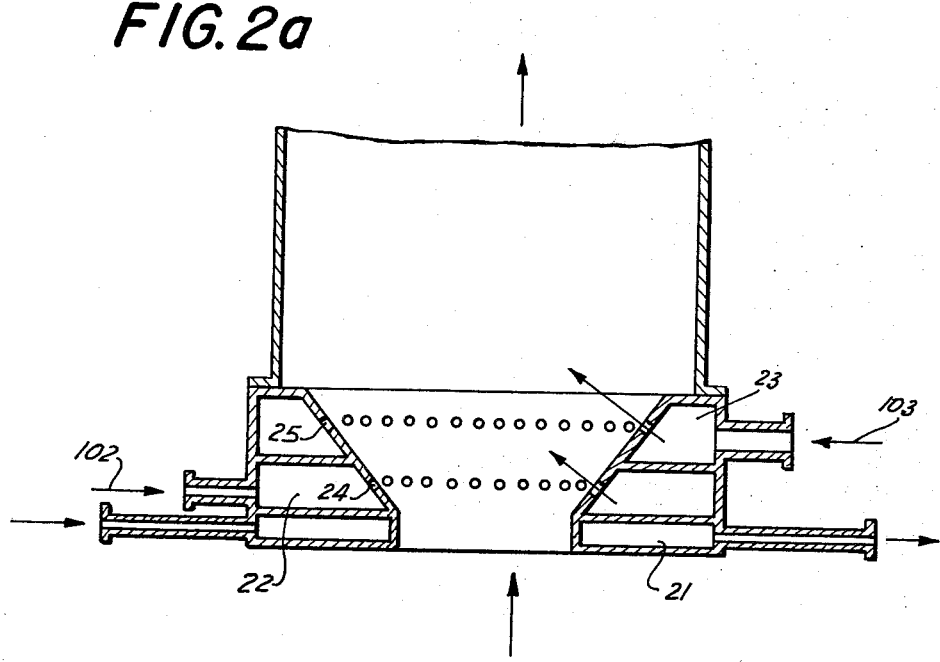
FIG. 2a shows in cross-section a detail view of the mixing chamber used in the process.
Figure 2B:
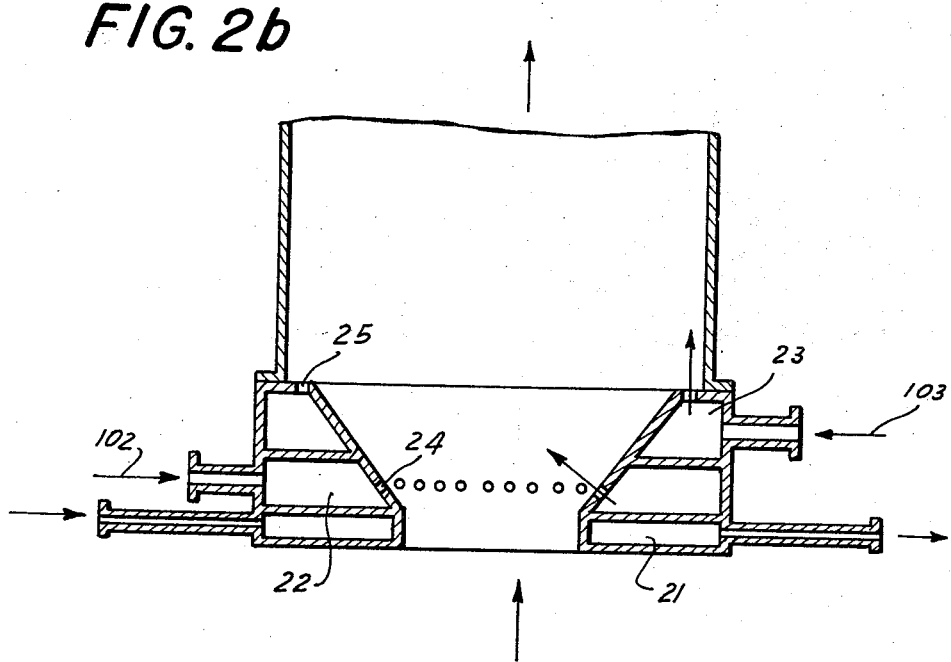
FIG. 2b shows another embodiment of the mixing chamber in a similar view.

Now, turning to the gas mixing chamber shown in FIGS. 2a and 2b, it will be noted that the water vapor can be caused to react with the silicon monoxide-containing gas which emanates from the arc furnace. The lower portion of the mixing chamber in these Figures receives the SiO gas stream from below. This lower chamber consists of a chamber 21 through which the cooling agent which may be water flows and two chambers 22 and 23 which are disposed above the chamber 21. The water vapor which is necessary for the reaction with the silicon monoxide and which may be used in mixture with another gas enters the chamber 22 through duct 102. It leaves the chamber 22 by bores 24 arranged in the form of a ring of apertures. The bores can be formed in such a manner that the thin jet of steam issing therefrom impacts vertically on the hot silicon monoxide gas flow. However, they can also be formed in a manner such that the jets of steam impinge on the silicon monoxide in a predetermined angle of impact, as is shown in FIGS. 2a and 2b. The size and number of the bores must be adapted to the introduced amount of water vapor and the free diameter of the gas mixing device in order to permit a complete penetration of the SiO gas flow by the jets of water vapor.

The chilling agent is introduced into chamber 23 through duct 103 and leaves this duct again through the bores 25 in order to chill the reaction product. FIG. 2a shows an arrangement where the ring of bores 25 is disposed in a manner such that the chilling is effected immediately above the reaction zone of the silicon monoxide. FIG. 2b shows a different arrangement where the oulet bores for the chilling agent are arranged in the upper surface of the gas mixing chamber. This permits imparting a preferred upwardly directed flow direction to the chilling agent. As distinguished from FIG. 2a, this latter arrangement makes possible an extended reaction time of reaction between the silicon monoxide and the water vapor.

The contents of "active" hydrogen in the silicic acid made according to the present invention is best ascertained analytically, the treatment with potassium or sodium hydroxide and determination of the thus liberated amount of hydrogen. The reducing agents obtained by the reaction showed a generation of hydrogen in an amount of 100 ml. $H_2$/g. and above.

Little is known in a definitive way about the way the SiH groups are incorporated in the silicic acid. It now appears that there is a high probability that they are attached to the $SiO_2$ framework as polysilicoformic acid. The reducing effect of the silicic acid therefore is defined in the following as the contents of silicoformic acid, HSiOOH.

Products having a strong reducing action can be obtained by keeping the reaction time between the gaseous silicon monoxide and the water vapor short and effecting the chilling of the formed silicic acid very rapidly. Reaction times between 0.001 and 0.1 seconds are preferred. The amount of water must be larger than 1 mole $H_2O$ per mole SiO in order to cause the reaction to take place at a substantial rate. It has been found to be preferable to observe a ratio between 5 and 50 between $H_2O$ and SiO.

Increase of the reduction properties can be obtained if the reaction between the water vapor and the silicon monoxide is effected in the presence of hydrogen. Preferably a mixture of water vapor and hydrogen is introduced for this purpose into the mixing chamber 22 as shown in FIGS. 2a and 2b.

An improvement of the reduction properties can likewise be obtained by introducing gases into the electric arc. As gases not subject to undesirable reaction with the silicon monoxide there can for instance be used noble gases, hydrogen, nitrogen, carbon monoxide and mixtures of these gases.

The same type of gases and gas mixture can also be used for chilling the reaction product. These gases can then be recirculated into the process after separating the reaction product, driving off excess amounts and cooling the gases. It has been found that the circulating gas may even contain portions of unreacted water vapor without causing any substantial loss of reduction effect in the silicic acid when the gas is again used for chilling. It has even been found that the chilling itself can be effected with water vapor if a certain lowering of the reduction property of the silicic acid is accepted. Likewise, spray-injected water may be used. Preferably, a combination of steam and spray-injected water is employed. It is furthermore preferable to chill the reaction product to temperatures below 300–400°. This applies in particular when water is used as the chilling agent.

The reaction product should be removed from the gas stream soon after the chilling has been effected in order to maintain the reduction property. This applies particularly in those cases where the gas stream contains major amounts of water vapor. The silicic acid can be separated from the residual water vapor by a stream of dry gas after it has been removed from the apparatus. The thus-treated silicic acid retains its reduction properties over an extended period of time.

The following examples will further explain the invention. In all of these examples the reducing silicic acid is in the form of a loose, white powder which, in the Debye-Scherrer diagram, shows only the diffused reaction ring of the amorphous silicic acid. Electromicroscopes in these cases showed spherical but sometimes also irregular particles with dimensions between 5 and 200 m$\mu$.

EXAMPLE 1

A mixture of fractionated quartz and oil coke in a ratio of 5:1 was reacted in an electric arc furnace. There were formed an hourly output of 3.8 kg. gaseous silicon monoxide and 2.4 kg. carbon monoxide. Through chamber 22, as shown in FIGS. 2a and 2b, there were then introduced 40 Nm.$^3$ of water vapor into the gas stream leaving the furnace at a temperature between 1500 and 2500° C. Through chamber 23 an hourly input was provided at 90 Nm.$^3$ of nitrogen. A loose, flocculant white product was withdrawn from the separator. The product had "silicoformic acid" contents of 16.8% by weight. The bulk density was 24 g./l., the specific surface area measured by means of N$_2$ adsorption, according to the BET method, was 171 m.$^2$/g.

EXAMPLE 2

With a similar device as in Example 1, 10 Nm.$^3$ of water vapor were introduced through chamber 22 and 122 Nm.$^3$ of nitrogen were introduced through chamber 23. A white product having 10.0 wt.-percent of "silicoformic acid" and a specific surface area of 159 m.$^2$/g. was obtained.

EXAMPLE 3

A circulating apparatus as shown in Example 1 was used. Into this apparatus 50 Nm.$^3$ of water vapor were introduced through the lower chamber of the gas mixing chamber and 100 Nm.$^3$ of circulating gas (carbon monoxide with a small content of hydrogen) were fed through the upper chamber into an hourly gas flow of 3.75 kg. silicon monoxide and 2.4 kg. carbon monoxide. There was obtained a reducing silicic acid with "silicoformic acid" contents of 30.5 wt.-percent, a bulk density of 27 g./l. and a specific surface at 182 m.$^2$/g.

EXAMPLE 4

The method of Example 3 was modified by eliminating the cooling device 11 shown in FIG. 1. The product was obtained with a "wet" circulating gas. It has a silicoformic acid" content of 11.2 wt.-percent and a specific surface area of 165 m.$^2$/g.

EXAMPLE 5

In this case an hourly input through the lower chamber of FIG. 2 of 40 Nm.$^3$ water vapor and of 96 Nm.$^3$ water vapor into the upper chamber was effected into an hourly flow of 3.8 kg. silicon monoxide and 2.4 kg. carbon monoxide. The white product removed from the separator had a "silicoformic acid" content of 10.9 wt.-percent, a bulk density of 29 g./l., and a specific surface area of 181 m.$^2$/g.

EXAMPLE 6

The same method was followed as in Example 5 with the only difference being that the feeding from the lower chamber of the mixing device was 37.5 Nm.$^3$ water vapor and from the upper chamber 25 Nm.$^3$ water vapor per hour. The product obtained had a "silicoformic acid" contents of 4.8 wt.-percent, a bulk density of 36 g./l. and a specific surface area of 111 m.$^2$/g.

EXAMPLE 7

The same process, using a circulating gas, was used as in Example 3 with the difference that the feeding was effected from the lower chamber with a gas mixture of 34 Nm.$^3$ steam and 8 Nm.$^3$ hydrogen per hour. From the separator there was obtained a white, flocculant product which had a "silicoformic acid" contact of 26.7 wt.-percent and a specific surface area of 178 m.$^2$/g.

EXAMPLE 8

The same process was used as in Example 6. However, by means of hollow electrodes, there were fed 6 Nm.$^3$ of hydrogen per hour into the electric arc. There was obtained a loose white product with 24.3 wt.-percent "silicoformic acid," 18 g./l. bulk density, and a specific surface area of 214 m.$^2$/g.

EXAMPLE 9

From a ring of 60 apertures, 45 Nm.$^3$ water vapor were fed at an angle of inclination of 45° into a hot gas stream comprising 3.8 kg. silicon monoxide and 2.4 kg. carbon monoxide per hour. From the chamber above there were injected through nozzles 112 kg. stream/h. and water in an amount of 8 kg./h. Through hollow electrodes there were introduced 6 Nm.$^3$ nitrogen/h. into the electric arc. The product removed from the separator had a "silicoformic acid" content of 12.5% and a specific surface area of 210 m.$^2$/g.

EXAMPLE 10

The process in this example was the same as in Example 9, except that 4 Nm.$^3$ argon/hour were introduced through the hollow electrodes instead of the nitrogen. The product obtained had a "silicoformic acid" content of 14.4 wt.-percent, a bulk density of 16 g./l. and a specific surface area of 194 m.$^2$/g.

EXAMPLE 11

The process in this example was the same as in Example 4. However, there were fed into the electric arc additionally, by means of hollow electrodes, an hourly mixture of 6 Nm.$^3$ of 60 vol.-percent of hydrogen and 40 vol.-percent carbon monoxide. There was obtained a white flocculant product with 15.3 wt.-percent "silicoformic acid," a bulk density of 22 g./l. and a specific surface area of 145 m.$^2$/g.

EXAMPLE 12

A mixture from fractionated quartzite and silicon in a ratio of 2.1:1 was reacted in an electric arc furnace. There was produced 7.7 kg. of gaseous silicon monoxide per hour. Into the hot silicon monoxide gas stream there were introduced, through a gas chamber as shown in Example 2, 115 Nm.$^3$ of water vapor through the chamber 22 and 150 Nm.$^3$ of water vapor through the chamber 23. Through hollow electrodes there were introduced 10 Nm.$^3$ argon per hour into the electric arc. The product removed from the separator had a "silicoformic acid" content of 22.4 wt. percent, a bulk density of 23 g./l., and a specific surface area of 164 m.$^2$/g.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of making a finely divided white pulverulent silicic acid having surface bonded Si-H groups attached to the molecule, the said silicic acid having reducing properties as established by the contents of silicoformic acid and the reduction of metal ions in metal salts and consequent development of hydrogen, the said process comprising forming gaseous silicon monoxide in an electric furnace, passing the gas to a reaction zone immediately adjoining said electric furnace and reacting the gas in said reaction zone while its temperature is above 1500° C. with steam at a ratio of H$_2$O:SiO between 5:1 and 50:1 so as to form said Si—H groups containing reaction product and immediately after its formation contacting the product with a chilling medium to effect sudden chilling to a temperature below 400° C. and thereafter separating the solid silicic acid product from the residual gas.

2. The process of claim 1, wherein the time of reaction between the silicon monoxide and the water vapor is 0.001 to 0.1 seconds.

3. The process of claim 1, wherein the reaction with steam and the subsequent chilling are effected in the same reaction zone.

4. The process of claim 1, wherein the silicon monoxide-carbon monoxide gaseous mixture is formed by vaporizing quartz and coke in said electric furnace.

5. The process of claim 1, wherein the gaseous silicon monoxide or silicon monoxide-carbon monoxide mixture, prior to the reaction with the steam, is diluted with an additional gas, the said gas being selected from the group consisting of noble gases, hydrogen, nitrogen, carbon monoxide and a mixture of these gases.

6. The process of claim 5 wherein the steam is mixed with hydrogen or a hydrogen-containing gas or gas mixture to increase the reducing properties of the silicic acid obtained.

References Cited
UNITED STATES PATENTS

| | | | |
|---|---|---|---|
| 2,715,060 | 8/1955 | Barry | 423—336 |
| 2,993,809 | 7/1961 | Bueche et al. | 423—337 X |
| 3,053,627 | 9/1962 | Flemmert | 423—336 |
| 3,269,799 | 8/1966 | Gunn, Jr. | 423—336 |
| 3,328,125 | 6/1967 | Mays et al. | 423—325 |
| 3,554,698 | 1/1971 | Burzynski et al. | 423—325 |
| 3,574,135 | 4/1971 | Sampson et al. | 423—336 |
| 3,674,430 | 7/1972 | Illigen et al. | 423—325 |

EDWARD STERN, Primary Examiner

U.S. Cl. X.R.

423—325, 335; 106—288 B